(12) United States Patent
Tan

(10) Patent No.: US 9,184,778 B2
(45) Date of Patent: Nov. 10, 2015

(54) VEHICLE INFORMATION GATHERING SYSTEM

(71) Applicant: Nissan North America, Inc., Franklin, TN (US)

(72) Inventor: Adrian K. Tan, Northville, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 71 days.

(21) Appl. No.: 13/774,639

(22) Filed: Feb. 22, 2013

(65) Prior Publication Data

US 2014/0244104 A1 Aug. 28, 2014

(51) Int. Cl.
*H04B 1/3822* (2015.01)

(52) U.S. Cl.
CPC .................... *H04B 1/3822* (2013.01)

(58) Field of Classification Search
CPC ............................... H04B 1/3822; H04B 1/38
USPC ............................................................ 701/36
See application file for complete search history.

(56) References Cited

U.S. PATENT DOCUMENTS

| | | | |
|---|---|---|---|
| 5,949,484 A | 9/1999 | Nakaya et al. | |
| 6,144,865 A | 11/2000 | Pichard | |
| 6,356,841 B1 | 3/2002 | Hamrick et al. | |
| 6,427,072 B1 | 7/2002 | Reichelt | |
| 6,721,580 B1 | 4/2004 | Moon | |
| 7,869,916 B2 * | 1/2011 | Pilgrim et al. | 701/34.4 |
| 8,055,403 B2 | 11/2011 | Lowrey et al. | |
| 8,086,368 B2 | 12/2011 | Petricoin, Jr. et al. | |
| 2002/0183036 A1 | 12/2002 | Marko et al. | |
| 2003/0130005 A1 * | 7/2003 | Weisshaar et al. | 455/525 |
| 2004/0139180 A1 | 7/2004 | White et al. | |
| 2005/0137790 A1 * | 6/2005 | Yamada et al. | 701/202 |
| 2009/0184833 A1 * | 7/2009 | Tonegawa et al. | 340/636.2 |
| 2009/0265099 A1 | 10/2009 | Gottlieb | |
| 2010/0250106 A1 * | 9/2010 | Bai et al. | 701/117 |

OTHER PUBLICATIONS

JWK Software, NFC Based Mobile Apps: NFC Task Launcher, Jul. 16, 2011, https://sites.google.com/site/nfctasklauncher/.*
Jeff Causey, NFC Task Launcher rebranded as Trigger . . . , Oct. 28, 2013, http://www.talkandroid.com/181240-nfc-task-launcher-rebranded-as-trigger-to-go-with-some-updates/.*

(Continued)

*Primary Examiner* — John Q Nguyen
*Assistant Examiner* — Nadeem Odeh
(74) *Attorney, Agent, or Firm* — Global IP Counselors, LLP

(57) ABSTRACT

A vehicle information gathering system comprises an onboard communication device, an onboard storage device and an onboard controller. The onboard communication device communicates with external data sources. The onboard storage device stores a data set comprising at least one data subset reference. The onboard controller automatically determines an availability of each of the external data sources, assigns a respective communication priority to each data subset reference based on the availability of each of the external data sources and at least one priority criteria, assigns at least one external data source to each data subset reference based on the availability and the priority criteria, and controls the communication device to communicate with at least one external data source based on the respective communication priority assigned to each data subset reference to receive at least one data subset via the assigned external data source for storage on the storage device.

21 Claims, 3 Drawing Sheets

(56) References Cited

OTHER PUBLICATIONS

Egomotion Corp., 'Trigger'—Features, Nov. 10, 2013, http://gettrigger.com/#features.*

Google Play Store, 'Trigger' App Webpage, Jun. 10, 2014 (date of latest update, not release date), https://play.google.com/store/apps/details?id =com.jwsoft.nfcactionlauncher&hl=en.*

* cited by examiner

VEHICLE INFORMATION GATHERING SYSTEM

BACKGROUND

1. Field of the Invention

The present invention generally relates to a vehicle information gathering system. More particularly, the present invention relates to a system that enables a communication device onboard a vehicle to receive data from external data sources based on the availability of the external data sources and priority criteria assigned to different types of data.

2. Background Information

In recent years, vehicles have become more equipped with information systems such as sophisticated navigation systems, diagnostic systems, and entertainment systems, to name a few. It is therefore desirable for the vehicle to be capable of receiving information for use by these systems. Typically, vehicles can receive this information over different types of networks, such as wireless networks (e.g., WiFi® networks), mobile service provider networks, satellite communication networks, and so on. However, some of the networks may not always be available. Thus, it can often be difficult or inefficient for a vehicle to download certain information.

Accordingly, a need exists for an improved system for providing information to a vehicle.

SUMMARY

In accordance with one aspect of the present invention, a vehicle information gathering system comprises an onboard communication device, an onboard storage device and an onboard controller. The onboard communication device is configured to communicate with a plurality of external data sources. The onboard storage device is configured to store a data set comprising at least one data subset reference. The onboard controller is configured to automatically determine an availability of each of the plurality of external data sources, automatically assign a respective communication priority to each of the at least one data subset reference based on the availability of each of the plurality of external data sources and at least one priority criteria, automatically assign at least one of the plurality of external data sources to each of the at least one data subset reference based on the availability and the at least one priority criteria, and automatically control the communication device to communicate with at least one of the external data sources based on the respective communication priority assigned to each of the at least one data subset reference to receive at least one data subset via the assigned external data source for storage on the storage device.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the disclosed embodiments are provided for illustration only and not for the purpose of limiting the invention as defined by the appended claims and their equivalents.

Figure 1:
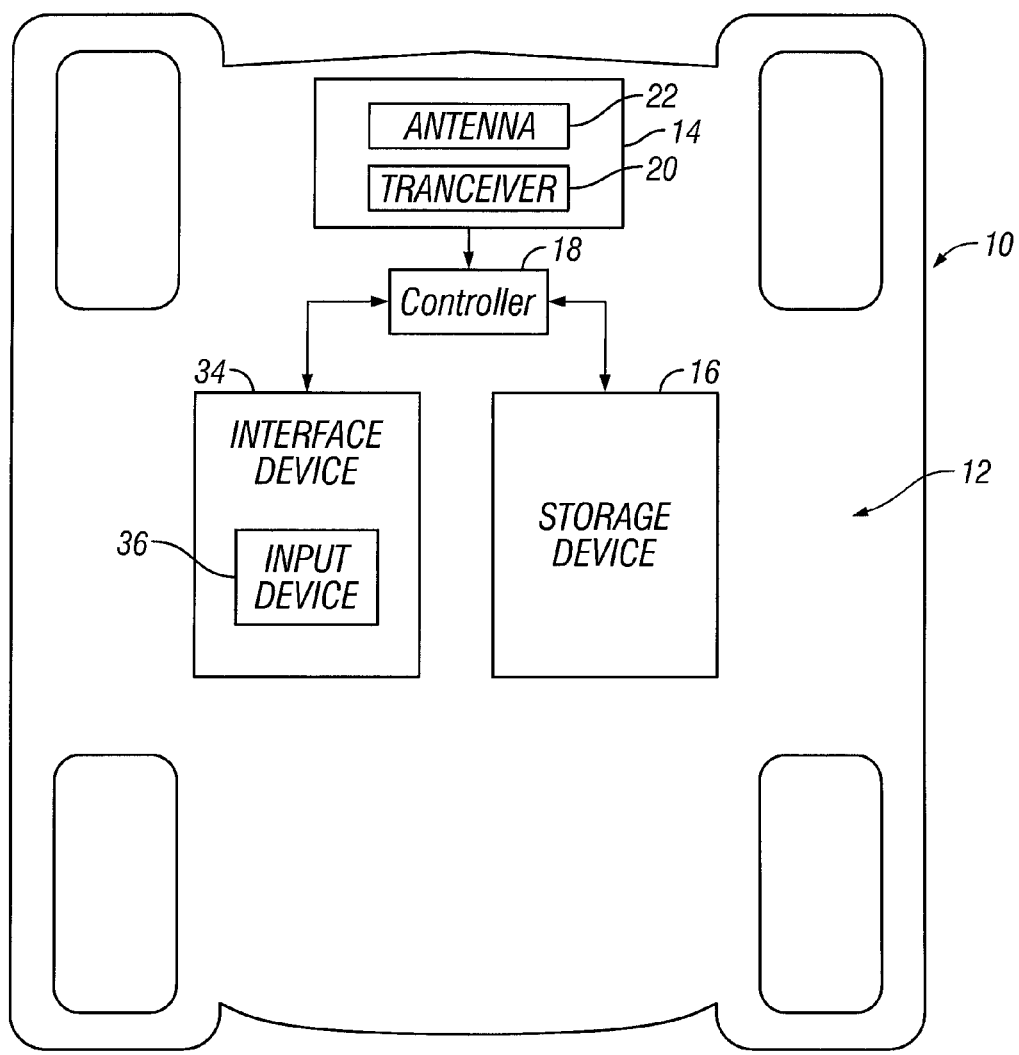
FIG. 1 is a block diagram illustrating an example of a vehicle equipped with a vehicle information gathering system according to a disclosed embodiment.

FIG. 1 is a block diagram illustrating a vehicle 10 that is equipped with a vehicle information gathering system 12 according to a disclosed embodiment. The vehicle information gathering system 12 includes an onboard communication device 14, an onboard storage device 16, and an onboard controller 18.

Figure 2:
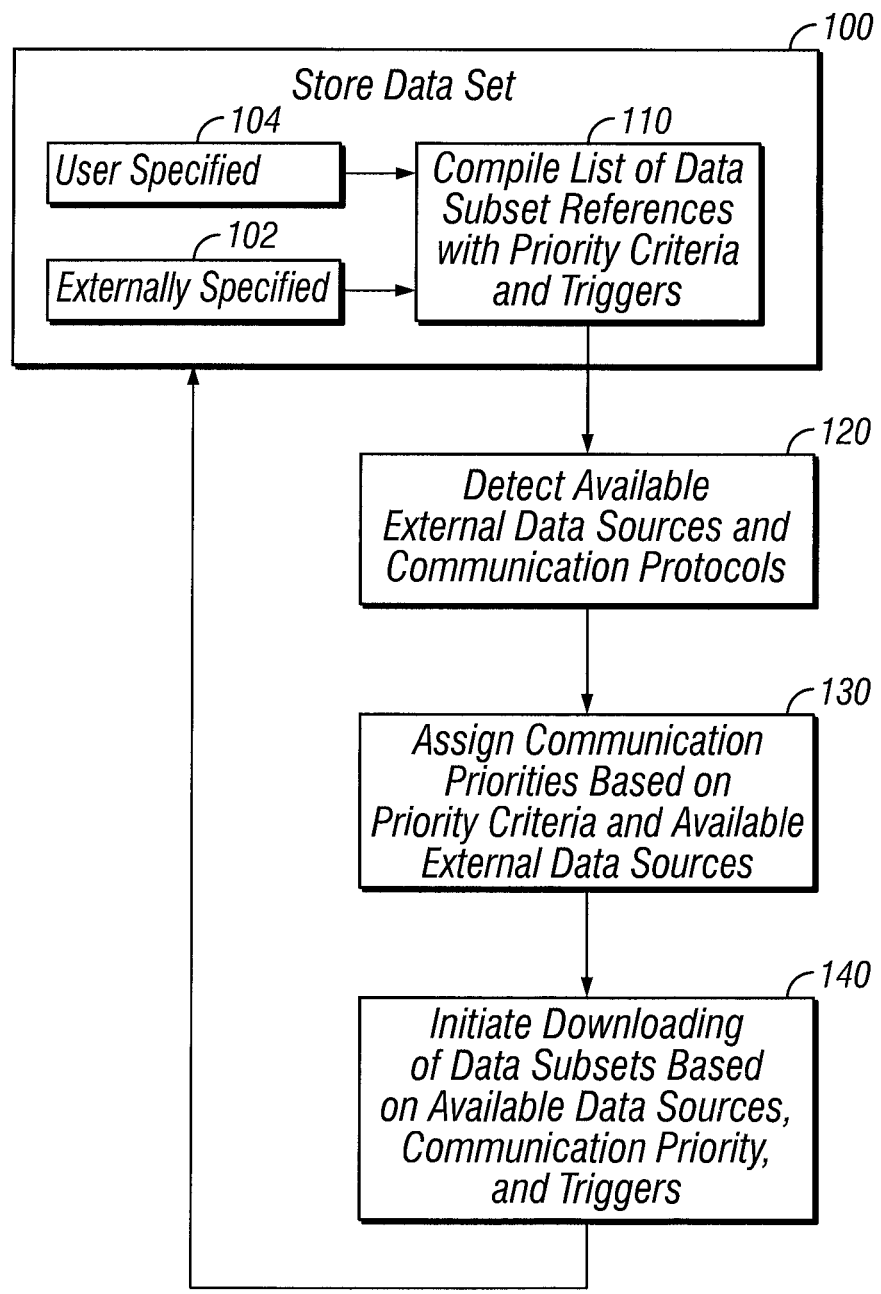
FIG. 2 is a flowchart illustrating an example of operations performed by the vehicle information gathering system as shown in FIG. 1.

The onboard communication device 14 is configured to communicate with a plurality of external data sources as discussed below. For example, the onboard communication device 14 can include a plurality of communication interfaces, such as a transceiver arrangement 20 and an antenna arrangement 22, that enable the onboard communication device 14 to communicate with, for example, a WiFi network 24, a mobile service provider network 26, a satellite communication network 28, a wireless infrastructure communication network 30 such as a dedicated short range communications (DSRC) network, a telematics network 32, a utility provider network 37 and so on in a manner as understood in the art and as shown in FIG. 2 which is discussed in more detail below. Thus, the plurality of communication interfaces includes at least two of a telematics interface, a mobile service interface, a mobile device tethering interface, a satellite interface, a wireless Internet interface, a wired Internet interface, an infrastructure communication interface and a vehicle-to-vehicle communication interface, to name a few, as well as any other type of communication interface suitable for use with the vehicle information gathering system 12. The onboard communication device 14 can thus receive the types of data discussed below, as well as position information, such as Global Positioning System (GPS) data which enables the onboard controller 18 to determine the location of the vehicle 10 in any manner as understood in the art.

The onboard storage device 16 includes a memory that is configured to store a data set comprising at least one data subset reference as discussed below. The onboard controller 18 preferably includes a microcomputer with a control program that controls the components of the vehicle information gathering system 12 as discussed below. The onboard controller 18 includes other conventional components such as an input interface circuit, an output interface circuit, and storage devices such as a ROM (Read Only Memory) device and a RAM (Random Access Memory) device. The microcomputer of the onboard controller 18 is at least programmed to control the vehicle information gathering system 12 in accordance with the flow chart of FIG. 2 as discussed below. It will be apparent to those skilled in the art from this disclosure that the precise structure and algorithms for the onboard controller 18 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause. Furthermore, the onboard controller 18 can communicate with the other components of the vehicle information gathering system 12 discussed herein in any suitable manner as understood in the art.

For example, as shown in the flowchart in FIG. 2, the onboard controller 18 can operate in step 100 to store the data set in the onboard storage device 16. That is, the onboard controller 18 can control the onboard communication device 14 in step 102 to communicate with any of the available external data sources discussed above to receive the data set for storage in the onboard storage device 16 or receive updates to change the data set stored in the onboard storage device 16. Thus, as can be appreciated by one skilled in the art, the onboard controller 18 can communicate with the at least one of the external data sources via, for example, the onboard communication device 14, so that the data subsets can be pushed to the onboard storage device 16 from at least one of the plurality of external data sources.

Also, in step 104 the onboard controller 18 can communicate with an interface device 34 including an input device 36 via which a user can enter information pertaining to the data set. As can be appreciated by one skilled in the art, the input device 36 can include, for example, an input port such as a USB port or any other standard type of interface port that enables the vehicle information gathering system 12 to receive information from an external source. Furthermore, the input device 36 can include a keypad, a display device, a microphone and so on which enables the user to interface with the vehicle information gathering system 12 as discussed herein. Therefore, the user can create the data set, enter information into the data set, and/or change the information in the data set. For instance, Service Bulletin data and Stock data, such as stock quotes, can be received via a mobile service provider connection based on a user preference that the user can set. Alternatively, the data set can be pre-programmed into the onboard storage device 16. This pre-programmed information can be altered or replaced with different information using the onboard communication device 14, the interface device 34, or both as discussed above.

Thus, in step 110, the onboard controller 18 can compile and store data subset references in the onboard storage device 16 based on user input and/or automatically when updates become available from a data source, such as one of the external data sources discussed herein. Furthermore, updates can be pushed from the data source to the vehicle information gathering system 12 at any desired time, such as when updates become available, at a designated time prior to departure of the vehicle 10 from a parked position, and so on.

An example of a data set is shown in Table 1 below, with each data subset reference being listed in the Data Type column as indicated. As indicated, the types of data include information service data such as news, stock information, "rich site summary" or "real simple syndication" (RSS®) feed data, and telematics information such as that provided by CARWINGS®, to name a few. The types of data can also include customer relations data such as service bulletins, owner manual information such as owner manual updates, and community information such as ecology rankings (ECO). Furthermore, the types of data can include personal data such as email, multimedia messages (MMS), texts and so on. Also, the types of data can include entertainment and media data, such as audio data (e.g., music, podcasts, etc.), video data (e.g., movies for rear seat entertainment systems), and so on. Typically, this type of entertainment and media data can be downloaded from, for example, a personal computer (PC) via a WiFi network or can be downloaded from a cloud network via the Internet. Vehicle management (VRM) data can also be included such as engine control module (ECM) data, software updates such as firmware updates, patches, virus fixes, etc., map updates and database updates. The Data Types are not listed in any particular order of priority, and can be stored in the onboard storage device 16 in any suitable manner for access by the onboard controller 18 as discussed herein.

TABLE 1

Example Data Set

| Data Type | Priority | Size | Data Sources | Secure | Connection Protocols | SOC | Triggers |
|---|---|---|---|---|---|---|---|
| News | L | 25 MB | Internet | N | WiFi, Mobile | >50% | WiFi Available, 5 Minute Intervals |
| Stocks | L | 200 KB | Internet | Y | WiFi, Mobile | >50% | Secure Connection Available |
| CARWINGS ® Information | M | 100 MB | Telematics | Y | Telematics | >20% | Telematics Available |
| Traffic | M | 20 MB | Internet, Satellite, Infrastructure | N | WiFi, Satellite, DSRC | >0% | 30 Millisecond Intervals |
| Service Bulletin | M | 150 KB | Internet, Telematics | N | WiFi, Telematics | >0% | Telematics Available, WiFi Available |
| Owner Manual Updates | M | 50 MB | Internet, Telematics | N | WiFi, Telematics | >20% | Telematics Available, WiFi Available |
| Email | L | 5 MB | Internet | Y | WiFi, Mobile | >20% | Secure Connection Available |
| MMS | L | 5 KB | Mobile | Y | Mobile | >20% | Mobile Network Available, Mobile Device Connected |

TABLE 1-continued

Example Data Set

| Data Type | Priority | Size | Data Sources | Secure | Connection Protocols | SOC | Triggers |
|---|---|---|---|---|---|---|---|
| Audio | L | 250 MB | Home Network | N | WiFi | >75% | At Home, X Time Before Departure, Secure Connection Available |
| Video | L | 16 GB | Home Network | N | WiFi | >75% | At Home, X Time Before Departure, Secure Connection Available |
| ECM Updates | H | 50 MB | Telematics | Y | Telematics | >20% | Telematics Available |
| Map Updates | H | 2 GB | Telematics, Satellite | Y | Telematics, Satellite | >75% | Telematics or Satellite Available |
| Application Updates | H | 50 MB | Internet | Y | WiFi, Mobile | >50% | Secure Connection Available |
| Utility Charging Schedule | M | 5 MB | Utility Provider Network, Internet | N | Charger, WiFi | >0% | Connection to Charger, WiFi Available |

As can be appreciated from Table 1, each data subset reference has at least one associated priority criteria. The onboard controller 18 can assign priority criteria information in the data set using the onboard communication device 14, the interface device 34, or both as discussed above. In this example, the priority criteria can include and/or be determined based on at least one of the following: data type, size, preferred external data source, importance, time criticality, vehicle power supply state of charge (SOC), vehicle travel state, and security level. Additionally, each of the data subset references can include an associated trigger, which is an event which must occur or a condition that must exist before the vehicle information gathering system 12 will attempt to download the associated data subset. Types of triggering events can include time criticality indications. For example, it is desirable to download some types of data prior to a vehicle 10 departing from a location, such as a user's home. The vehicle information gathering system 12 continually monitors which external data sources are available, which connection protocols are available, and the appropriate trigger events. The vehicle information gathering system proceeds with connecting to available external data sources via the available connection protocols to download each of the data subsets in order according to the priority criteria and triggers as will be discussed in further detail below.

One such priority criterion is importance (i.e., priority level), such as a priority level low "L", medium "M" or high "H." Typically, it may be desirable to download important data subsets first, such as patches, virus fixes, software updates, etc. regardless of the type of connection. Each data subset reference further has an associated size, which can represent either an expected size or a typical maximum size of that type of data that is received by the vehicle information gathering system 12 while receiving that data subset. Thus, it may be desirable to download those data subsets having a large expected size via "cost free" and high-speed connections such as a home WiFi network, WiFi hotspots and so on. Also, each data subset reference is associated with a type of data source and connection protocol via which the onboard communication device 14 can communicate to receive that type of data. Furthermore, the data set indicates whether a secure connection with authentication, such as a home WiFi network or subscribed mobile network provider, is required for the onboard communication device 14 to receive that type of data subset, and the type of triggering events that can cause the onboard communication device 14 to receive that type of data.

Regarding vehicle power supply state of charge (SOC) as a priority criterion, in the case of a vehicle without an electromotive power source (e.g. internal combustion engine vehicle), SOC is typically irrelevant and can either be disregarded or not included in the data set. On the other hand, for a vehicles having electromotive power sources (e.g. electric vehicles or hybrid vehicles), SOC may be an essential priority criterion. Thus, to preserve battery power, it may be desirable for the vehicle information gathering system 12 to be programmed to download all types of data while the vehicle 10 is charging via a connection to a vehicle charging unit 32 in accordance with the other priority criteria. The onboard controller 18 can determine the SOC and the vehicle travel state. For example, if the vehicle 10 has an electromotive power source, the onboard controller 18 can determine whether the battery of the vehicle 10 is being charged. Also, the onboard controller 18 can determine the vehicle travel state by determining whether the vehicle 10 is stationary or moving. For an electric or hybrid vehicle, the onboard controller 18 can determine whether the vehicle 10 is using electric power, power provided by a combustion engine, or both. The onboard controller 18 can limit the amount of communications that occur when the battery of the vehicle 10 is not being charged or when the vehicle 10 is running on electric power to reduce depletion of the battery.

As indicated, examples of types of connection protocols can include telematics connections such as CARWINGS® via a mobile service provider or a dedicated telematics communications infrastructure, mobile service provider (i.e. cellular) connections such as direct vehicle to mobile service tower connections, and indirect mobile service provider connections such as vehicle to mobile device to mobile tower connections using, for example, a USB port, BLUETOOTH® technology, a WiFi hotspot (i.e. tethering), and so on. Types of connection protocols can further include satellite connections, such as satellite radio, GPS, and so on, and WiFi/Internet connections such as hotspot devices, public secured and unsecured WiFi networks, home or office secured or unsecured WiFi networks, data transfer over power lines via, for example, charging units and so on. In addition, types of connection protocols can include dedicated short range communications (DSRC) connections, including vehicle-to-vehicle (V2V) and vehicle-to-infrastructure (V2I) communication. One example includes fleet type connections where one vehicle directly downloads information from a fleet management network via a V2I DSRC communication protocol, shares the information to a plurality of nearby vehicles via a V2V DSRC communication protocol, which then share the information with more vehicles.

Figure 3:
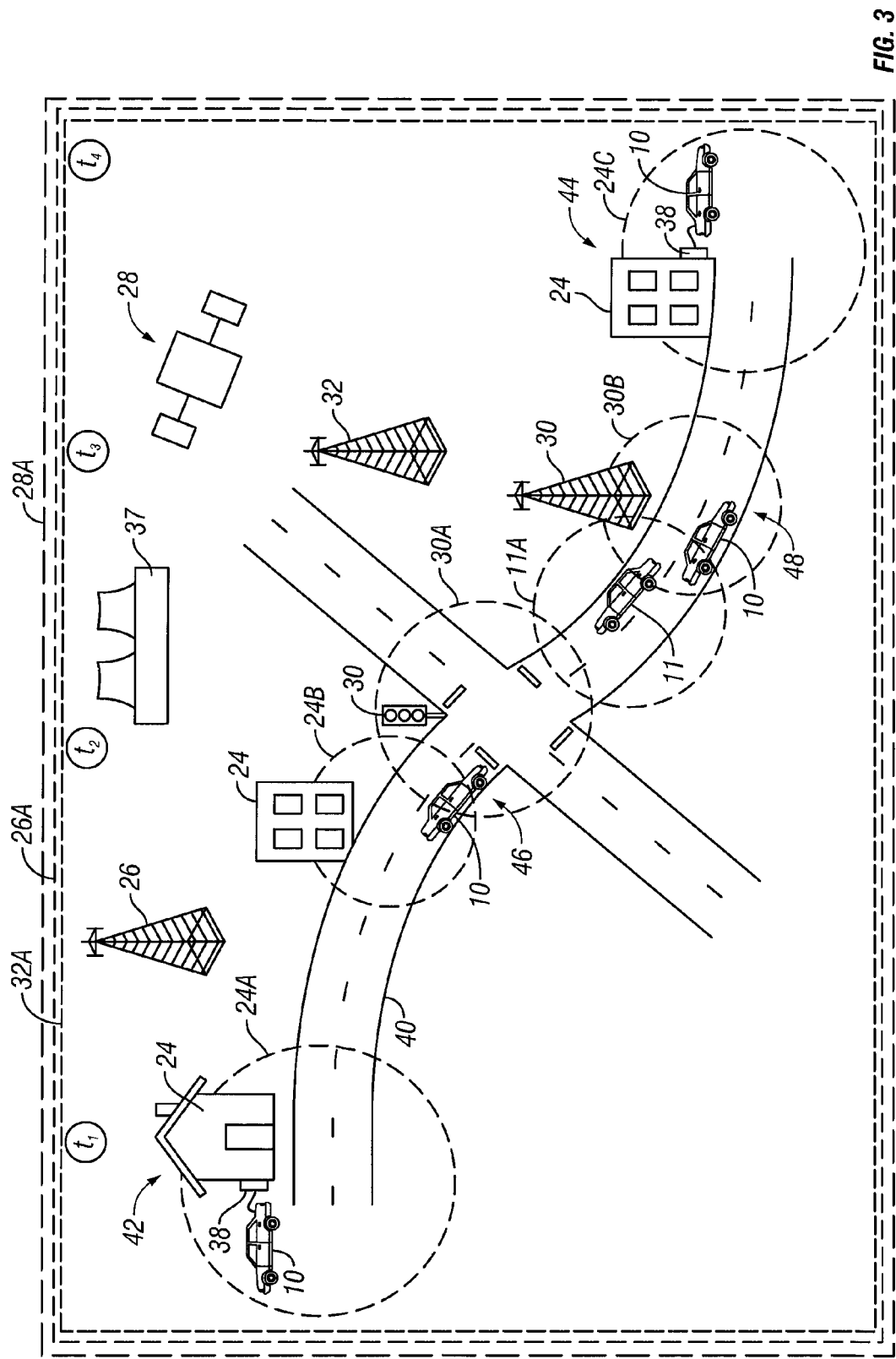
FIG. 3 is a diagrammatic view of the vehicle shown in FIG. 1 travelling along a route having different external data sources available at different locations.

In the example data set of Table 1, the first type of data subset reference listed in the data set is news, which can be in the form of "rich site summary" (RSS) data. As indicated in the example data set, this type of data subset is low priority (L) data, and generally has an expected size of 25 MB. The Internet is the type of data source via which the onboard communication device 14 receives this type of data subset. No secure connection is necessary for the onboard communication device 14 to receive this type of data subset. However, a WiFi connection protocol is used in this example for the onboard communication device 14 to receive this type of data subset via a WiFi network 24 as shown in FIG. 3. Furthermore, the onboard communication device 14 can be triggered to receive this type of data subset at certain time intervals, such as 5 minute time intervals, when a WiFi connection is available as discussed in more detail below.

As further shown, the second type of data subset reference listed in the data set is personal financial information, such as stock portfolio information, that the user can access via the vehicle information gathering system 12. As indicated in the data set, this type of data subset is low priority (L) data, and generally has an expected size of 200 KB. The Internet is the type of data source via which the onboard communication device 14 receives this type of data subset. However, since the communications involve a user's personal information, such as a user's login and account information, a secure connection may be necessary or desired for the onboard communication device 14 to receive this type of data subset and to safely communicate with the data source. As can be appreciated from Table 1, audio and video data can require a secure data connection since a user may be prompted to enter user login information prior to the audio and/or video data being downloaded to the vehicle information gathering system 12 as discussed herein.

Also, either a WiFi connection protocol or a mobile service connection protocol is used in this example for the onboard communication device 14 to receive the Stocks data subset and thus communicate with the data source. Thus, the onboard communication device 14 can receive the Stocks data subset via a WiFi network 24 or a mobile service provider network 26 as shown in FIG. 3 in a manner as known in the art. Furthermore, the onboard communication device 14 can be triggered to receive this type of data when a secure connection becomes available as discussed in more detail below.

As can also be appreciated from Table 1, some types of data subset references, for example, data provided by a telematics information service such as CARWINGS®, traffic information data, service bulletin data and owner manual update data are identified as being medium (M) priority data. This indicates that the vehicle information gathering system 12 should receive this type of data before receiving low (L) priority data when the types of data sources and connection protocols for low and medium priority data are available at the same time. As can further be appreciated from Table 1, other types of data subset references, for example, electronic control module (ECM) data, map update data and applications update data are identified as being high (H) priority data. This indicates that the vehicle information gathering system 12 should receive this type of data before receiving low (L) priority data and medium (M) priority data when the types of data sources and connection protocols for low and/or medium priority data are available at the same time as the data sources and connection protocols for high priority data.

It should also be noted that as understood in the art, the onboard communication device 14 in the vehicle 10 and the onboard communication devices in other vehicles 11 can enable vehicle-to-vehicle (V2V) communications via, for example, dedicated short range communications (DSRC) as understood in the art. Accordingly, the onboard controller 18 can control the onboard communication device 14 to provide at least one received data subset to at least one other vehicle via, for example, wireless communication over DSRC.

FIG. 3 is a diagrammatic representation of the vehicle 10 traveling along a route 40 from a starting location 42 toward a destination location 44. The route 40 can be a predicted travel schedule of the vehicle 10. For instance, the user can enter a destination in the navigation system of the vehicle 10, and the navigation system can establish a predicted travel schedule. Also, the onboard controller 18 can determine the route 40 based on travel history of the vehicle 10. For example, if the user drives the vehicle 10 from the user's residence to the user's office every weekday morning along the same route, the onboard controller 18 can determine the route based on the GPS information and so on as understood in the art. Therefore, the onboard controller 18 can predict the route 40 during a particular time of day based on the travel history of the vehicle 10.

In this example, the starting location 42 can be the user's residence. The time that the vehicle 10 is at the starting location 42 can be referred to as Time Period $t_1$ as indicated in FIG. 3. While the vehicle 10 is at the starting location 42, in step 120 the onboard controller 18 can control the onboard communication device 14 to search for the presence of signals from a WiFi network 24, a mobile service provider network 26, a satellite communication network 28, a wireless infrastructure communication network 30, a telematics network 32, a utility provider network 37 and so on in any manner as known in the art. The onboard controller 18 can therefore determine which types of signals are present.

Accordingly, while the vehicle 10 is at the starting location 42 as shown in FIG. 3, the onboard controller 18 may determine which external data sources are available and which connection protocols are available to communicate with the available external data sources in step 120 of FIG. 2. For example, while at starting location 42 in FIG. 3, the vehicle information gathering system 12 of the vehicle 10 has access to a home WiFi network, diagrammatically represented by the user's home 24, as the vehicle 10 is within the communication range 24A of the home WiFi network. Furthermore, the vehicle 10 is within a communication range 26A of a mobile service provider network, diagrammatically represented by a mobile service tower 26; a communication range 28A of a satellite communications network, diagrammatically represented by a satellite 28; and a communication range 32A of a telematics network, diagrammatically represented by a telematics service tower 32. As shown in FIG. 3, the vehicle 10 is also connected to a charger 38, through which the vehicle information gathering system 12 may communicate with a utility service provider network, diagrammatically represented by the power plant 37, to download a charging rate schedule, for example.

The onboard controller 18 can therefore establish a list of available external data sources and the associated types of connection protocols at the starting location 42. An example of such a list is shown in Table 2 below.

TABLE 2

Available External Data Sources

| Available External Data Sources | Types of Connection Protocols | Secure |
|---|---|---|
| Internet | WiFi | Y |
| Home Network | WiFi | Y |
| Internet | Mobile Service | Y |
| Mobile Service Provider Network | Mobile Service | Y |
| Satellite | Satellite | N |
| Telematics Network | Telematics | Y |
| Utility Provider Network | Vehicle Charger | N |

In step 130, the onboard controller 18 then automatically assigns a respective communication (e.g., downloading) priority to each of the data subset references based on the availability of each of the plurality of external data sources as shown, for example, in Table 2 and at least one priority criteria. As discussed above, the priority criteria can include, for example, the priority levels and data sizes indicated in Table 1. The assigned respective communication priorities indicate the order in which the onboard controller 18 controls the onboard communication device 14 to communicate with the available external data sources to download the data for storage in the onboard storage device 16.

For example, Table 3 illustrates an example of the respective communication priorities that the onboard controller 18 assigns to the different types of data for downloading.

TABLE 3

Communication Priorities

| Download Priority | Data Type |
|---|---|
| 1 | Map Updates |
| 2 | ECM Updates |
| 3 | Application Updates |
| 4 | CARWINGS ® Information |
| 5 | Owner Manual Updates |
| 6 | Traffic |
| 7 | Utility Charging Schedule |
| 8 | Service Bulletin |
| 9 | Video |
| 10 | Audio |
| 11 | News |
| 12 | Email |
| 13 | Stocks |

As can be appreciated from Table 1 and Table 3, the Map Updates, ECM Updates, Application Updates and CARWINGS® Information data subset references are given the highest priorities because they have a high (H) priority and the associated external data sources (Internet, Home Network, Mobile Service Provider Network, Satellite, Utility Provider Network) are available at the starting location 42. In this example, the Map Updates data subset reference is given the highest priority based on the availability of the associated external data source, the high (H) priority criteria, and having the largest expected download size. However, the other data subset references may be given a higher priority than the Map Updates data subset reference based on additional criteria. For example, since the Audio and Video data subset references are only available at the starting location 42 from the home network 24, those data subset references may be given highest priority as their associated data subsets may only be downloaded at the starting location 42 while the other data subsets may be downloaded at other locations. Such an adjustment in the priority may take place during step 130 based on travel history as described above, or automatic or manual settings selected via the user interface 34 as described above. Additionally, since the vehicle 10 is connected to a charging unit 38 while at the starting location 42 at time $t_1$, the state of charge (SOC) criteria may disregarded when the priority is assigned to each data subset reference. SOC may affect the priority assigned to each data subset reference as the vehicle is travelling or parked and not connected to a charging unit 38, as described in further detail below.

As further appreciated from Table 1 and Table 3, the other data subset references are assigned communication priorities based on priority criteria such as the availability of an external data source, the availability of connection protocols, their respective priority level (H), (M) or (L), expected download size, and so on. In this example, all of the types of data having a medium (M) priority level are given higher communication priorities than the types of data having a low (L) priority level as long as an external data source and associated connection protocol is available for that particular data subset reference as indicated in Table 1. By way of example, if a telematics network 32 is unavailable at the starting location 42, even though the CARWINGS® Information data subset reference has a medium (M) priority level, it may be assigned the lowest communication priority 13 because no telematics network 32 is available at the starting location 42 and the CARWINGS® Information data subset reference priority level M is lower than the ECM updates data subset reference priority level H which also uses a telematics network 32 for downloading. Therefore, the onboard controller 18 assigns the CARWINGS® Information data subset reference the lowest communication priority and the ECM updates data subset reference the second lowest communication priority.

Additionally, the list shown in Table 2 may include its own priority order, based on speed of connection, power consumed by the connection protocols, size of data required to be downloaded via each connection protocol, and so on. The priority assigned to the connection protocols may further influence the priority of the data subset references as discussed below.

As further shown in the flowchart of FIG. 2, the processing downloads the data subsets in step 140 based on the priority criteria and the available connection protocols, as well as triggers associated with the data subset references. These triggers are indicated in Table 1. The onboard controller 18 automatically controls the onboard communication device 14 to communicate with at least one of the external data sources discussed above based on the respective communication priority assigned to each of the at least one data subset reference to receive at least one data subset via the assigned external data source for storage on the onboard storage device 16. For example, the onboard controller 18 automatically controls the onboard communication device 14 to begin receiving the corresponding data subset only upon determining that the assigned trigger event has occurred. Accordingly, in this example, the onboard controller 18 can automatically control the onboard communication device 14 to communicate with the WiFi network 24 or mobile service provider network 26 to receive the Application Updates data subset. The onboard controller 18 can then store the Application Updates data subset in the onboard storage device 16 and process this data as appropriate to update the applications being used by the vehicle information gathering system 12.

As can be appreciated from the above, the onboard controller 18 can assign the respective priority to each of the at least one data subset reference based on at least one priority criteria representing a prescribed vehicle travel state (e.g., stationary). For example, when the vehicle 10 is in a stationary state at the starting location 42 such as the user's residence, it may be advantageous for the vehicle information gathering system 12 to receive information from the Internet via the secure home WiFi network 24 instead of any other network such as the cellular network 26 because the home WiFi connection protocol has a lower cost for the user and is faster than the other available connection protocols. Thus, in step 140, the onboard controller 18 can automatically control the onboard communication device 14 to communicate with at least a certain one of the external data sources (e.g., the Internet via the secure home WiFi network 24) instead of at least one other of the external data sources (e.g., the mobile service provider network 26) based on a detected vehicle travel state (e.g., stationary) of the vehicle 10 in relation to the prescribed vehicle travel state included in the priority criteria associated with the Application Updates data subset reference. During time $t_1$, the onboard controller 18 automatically controls the onboard communication device 14 to communicate with the at least a certain one of the external data sources instead of the at least one other of the external data sources while the detected vehicle travel state indicates that the vehicle 10 is stationary.

It should be further noted that the onboard controller 18 can control the onboard communication device 14 to receive any or all of the data subsets simultaneously depending on the types of data sources and connections that are available. For example, the onboard controller 18 can control the onboard communication device 14 to receive all of the data subsets that can be received over the Internet via a WiFi network 24 simultaneously. The onboard controller 18 can control the onboard communication device 14 to receive all of the data subsets that can be received over the Internet or from the mobile service provider via a mobile service provider network 26 simultaneously, and so on. This grouping of data subsets can be performed in any order based on the communication priority as discussed herein.

After receiving the Map Updates data subset, the onboard controller 18 can update the communication priorities to remove the Map Updates data subset reference and increase the communication priorities of all of the other data subset references by 1. Therefore, the communication priorities can be updated as shown in Table 4.

TABLE 4

Communication Priorities

| Download Priority | Data Type |
|---|---|
| 1 | ECM Updates |
| 2 | Application Updates |
| 3 | CARWINGS ® Information |
| 4 | Owner Manual Updates |
| 5 | Traffic |
| 6 | Utility Charging Schedule |
| 7 | Service Bulletin |
| 8 | Video |
| 9 | Audio |
| 10 | News |
| 11 | Email |
| 12 | Stocks |

The processing can then return to step 100 and repeat as discussed above. If the onboard controller 18 determines in step 120 that the telematics network is still available via the telematics tower 32, the onboard controller 18 can then automatically control the onboard communication device 14 to communicate with the available telematics network to receive the ECM Updates data subset in step 140. The onboard controller 18 can then store the ECM Updates data subset in the onboard storage device 16 and process this data as appropriate to update the onboard engine control module (ECM). After receiving the ECM Updates data subset, the onboard controller 18 can update the communication priorities to remove the ECM Updates data subset and increase the communication priorities of all of the other types of data by 1.

The process can then return to step 100 and repeat as discussed above. If the onboard controller 18 determines in step 120 that any of the available external data sources or connection protocols are no longer available or any different external data sources or connection protocols become available even while the vehicle 10 remains at the starting location 42, the onboard controller 18 can adjust the communication priorities in step 130 based on the available data sources and available data connections as discussed above. The onboard controller 18 can then repeat step 140 to begin downloading the data subsets as discussed above.

The onboard controller 18 may continually perform step 120 of detecting available external data sources and connection protocols and step 130 of assigning priority to each of the data subset references to readjust the order of priority even while in the process of downloading an unfinished data subset. Should the priority change such that the priority of the data subset currently being downloaded is lowered, the onboard controller 18 may then cease downloading of the current data subset, and perform step 140 by starting to download the data subset that is then the highest priority. Alternatively, the onboard controller 18 may wait until the current data subset is completely downloaded before performing step 14 of initiating downloading of the highest priority data subset.

When the vehicle 10 begins to travel along route 40 as shown in FIG. 3, the onboard controller 18 will continually determine in step 120 which of the data sources and data connections are available. For example, when the vehicle 10 has travelled along the route 40 and is moving within location 46 during time $t_2$ as indicated in FIG. 3, the onboard controller 18 in step 120 can control the onboard communication device 14 to search for the presence of signals from a public WiFi network, diagrammatically represented by a building 24 at location 46; a mobile service provider network, diagrammatically represented by the mobile service tower 26; a satellite communication network, diagrammatically represented by the satellite 28, a wireless infrastructure communication network, diagrammatically represented by a traffic light 30 at location 46; a telematics network diagrammatically represented by the telematics tower 32; and so on as discussed above. The onboard controller 18 can therefore determine which types of signals are present and adjust the priority listing shown in Table 2 accordingly.

For example, as can be appreciated from FIG. 3, the vehicle 10 is within a communication range 24B of a public WiFi network 24, the communication range 26A of the mobile service provider network 26, and the communication range 28A of the satellite communication network 28 which are then determined in step 120 to be available at location 46. However, in this example, the public WiFi network 26 is an unsecured network. Thus, the list of available external data sources as shown in Table 2 can be adjusted as in Table 5 below.

TABLE 5

Available External Data Sources

| Available External Data Sources | Types of Connection Protocols | Secure |
|---|---|---|
| Internet | WiFi | N |
| Internet | Mobile Service | Y |
| Mobile Service Provider Network | Mobile Service | Y |
| Satellite | Satellite | N |
| Telematics Network | Telematics | Y |
| Infrastructure | DSRC | Y |

As discussed above, the onboard controller 18 then automatically assigns a respective communication (e.g., downloading) priority to each of the data subset references in step 130 based on the availability of each of the plurality of external data sources as shown, for example, in Table 5 and at least one priority criteria. Because it is assumed that the mobile service provider network 26 is capable of establishing a secure connection, even though no secure WiFi is available, the onboard controller 18 can still assign the respective communication priorities in a manner as shown in Table 6 below. As can be seen in Table 6, some of the data subset references have been removed between times $t_1$ (Table 3) and $t_2$ (Table 6). This can be because some of the data subsets have completed downloading at $t_1$ while the vehicle 10 was at the starting location 42. Additionally, the onboard controller 18 can disregard data subsets when their associated external data sources are unavailable, such as the Audio data subset reference and Video data subset reference since they are only associated with the home network that is not available at location 46. Alternatively, data subset references associated with unavailable external data sources may be moved to the end of the priority list. In this example, the Traffic data subset can have the highest communication priority because the onboard communication device 14 can receive the traffic data subset via the public WiFi, since a secure connection is not required, the mobile service provider network 26, or the infrastructure 30. However, it can be appreciated from the descriptions herein that the communication priorities assigned to the different types of data can change due to losing or gaining availability of different types of external data sources and connections, expected availability of such data sources and connections, and even the state of charge of an EV as discussed below.

TABLE 6

Communication Priorities

| Download Priority | Data Type |
|---|---|
| 1 | Traffic |
| 2 | Service Bulletin |
| 3 | CARWINGS ® Information |
| 4 | News |
| 5 | Email |
| 6 | Stocks |

The processing then initiates downloading the data subsets in accordance with the available connection protocols, priority order, and associated triggers in step 140 as discussed above. The onboard controller 18 automatically controls the onboard communication device 14 to communicate with at least one of the external data sources discussed above based on the respective communication priority assigned to each of the at least one data subset reference to receive at least one data subset via the assigned external data source for storage on the onboard storage device 16. During time $t_2$, the onboard controller 18 can automatically control the onboard communication device 14 to communicate with one of the external data sources (e.g., the mobile service provider network 26) instead of one of the other external data sources (e.g., the unsecure WiFi network 24) while the detected vehicle travel state indicates that the vehicle 10 is moving. The process then returns to step 100 and repeats as discussed above with regard to time $t_1$.

The vehicle 10 can continue to travel along route 40 as shown in FIG. 3, and the onboard controller 18 will continue to determine in step 120 which of the data sources and data connections are available. For example, when the vehicle 10 has travelled along the route 40 and is at location 48 during time $t_3$ as indicated in FIG. 3, the onboard controller 18 in step 120 can control the onboard communication device 14 to search for the presence of signals from a WiFi network 24, a mobile service provider network 26, a satellite communication network 28, a wireless infrastructure communication network 30, a telematics network 32 and so on as discussed above. The onboard controller 18 can therefore determine which types of signals are present and adjust the listing shown in Table 5 accordingly.

For example, as can be appreciated from FIG. 3, the vehicle 10 is within the communication range 26A of the mobile service provider network, diagrammatically represented by mobile service tower 26; the communication range 28A of the satellite communication network, diagrammatically represented by satellite 28; a communication range 30B of a wireless infrastructure road side unit 30, diagrammatically represented by road side unit 30 at location 48; and a communication range 11A of a DSRC-enabled neighboring vehicle 11 which are determined to be available at location 48. Thus, the list of available external data sources as shown in Table 5 can be adjusted as in Table 7 below.

TABLE 7

Available External Data Sources

| Available External Data Sources | Types of Connection Protocols | Secure |
|---|---|---|
| Infrastructure | DSRC | Y |
| Internet | Mobile Service | Y |
| Mobile Service Provider Network | Mobile Service | Y |
| Satellite | Satellite | N |
| Telematics Network | Telematics | Y |
| Neighboring Vehicle | DSRC | Y |

As discussed above, the onboard controller 18 then automatically assigns a respective communication (e.g., downloading) priority to each of the data subset references in step 130 based on the availability of each of the plurality of external data sources and connection protocols as shown, for example, in Table 7 and at least one priority criteria. The onboard controller 18 can still assign the respective communication priorities in a manner as shown in Table 6 above.

The processing then initiates downloading the data subsets in accordance with the available connection protocols, priority order, and associated triggers in step 140 as discussed above. The onboard controller 18 automatically controls the onboard communication device 14 to communicate with at least one of the external data sources discussed above based on the respective communication priority assigned to each of the at least one data subset reference to receive at least one data subset via the assigned external data source for storage on the onboard storage device 16. The process then returns to step 100 and repeats as discussed above with regard to times $t_1$ and $t_2$.

The vehicle 10 can continue to travel along route 40 as shown in FIG. 3, and the onboard controller 18 will continue to determine in step 120 which of the data sources and data connections are available. For example, when the vehicle 10 has travelled along the route 40 and arrives at the destination location 44 during time $t_4$ as indicated in FIG. 3, the onboard controller 18 in step 120 can control the onboard communication device 14 to search for the presence of signals from a WiFi network 24, a mobile service provider network 26, a satellite communication network 28, a wireless infrastructure communication network 30, a telematics network 32 and so on as discussed above. The onboard controller 18 can therefore determine which types of signals are present and adjust the listing shown in Table 7 accordingly.

For example, as can be appreciated from FIG. 3, the vehicle 10 is within the communication range 24C of the office WiFi network, diagrammatically represented by the building 24 at location 44; the communication range 26A of the mobile service provider network, diagrammatically represented by the mobile service tower 26; the communication range 28A of the satellite communication network, diagrammatically represented by satellite 28; and the communication range 32A of the telematics network, diagrammatically represented by telematics tower 32; and the vehicle 10 is connected to charging unit 38 which is in communication with the utility service provider network, diagrammatically represented by power plant 37, which are the external data sources determined to be available at destination location 44. Thus, the list of available external data sources as shown in Table 6 can be adjusted as in Table 8 below.

TABLE 8

Available External Data Sources

| Available External Data Sources | Types of Connection Protocols | Secure |
| --- | --- | --- |
| Office Network | WiFi | Y |
| Internet | WiFi | Y |
| Internet | Mobile Service | Y |
| Mobile Service Provider Network | Mobile Service | Y |
| Telematics Network | Telematics | Y |
| Satellite | Satellite | N |
| Utility Provider Network | Vehicle Charger | N |

As discussed above, the onboard controller 18 then automatically assigns a respective communication (e.g., downloading) priority to each of the data subset references in step 130 based on the availability of each of the plurality of external data sources and connection protocols as shown, for example, in Table 8 and at least one priority criteria. Table 9 illustrates an example of the respective communication priorities that the onboard controller 18 assigns to the different data subset references for downloading at destination location 44.

TABLE 9

Communication Priorities

| Download Priority | Data Type |
| --- | --- |
| 1 | Map Updates |
| 2 | ECM Updates |
| 3 | Application Updates |
| 4 | CARWINGS ® Information |
| 5 | Owner Manual Updates |
| 6 | Traffic |
| 7 | Utility Charging Schedule |
| 8 | Service Bulletin |
| 9 | News |
| 10 | Email |
| 11 | Stocks |

The processing then initiates downloading the data subsets in accordance with the available connection protocols, priority order, and associated triggers in step 140 as discussed above. The onboard controller 18 automatically controls the onboard communication device 14 to communicate with at least one of the external data sources discussed above based on the respective communication priority assigned to each of the at least one data subset reference to receive at least one data subset via the assigned external data source for storage on the onboard storage device 16. The process then returns to step 100 and repeats as discussed above with regard to times $t_3$.

As can be appreciated from the above, the onboard controller 18 can assign the respective communication priorities to the data subset references based on any of the priority criteria discussed above. For example, if the threshold vehicle power supply level of the vehicle battery (state of charge or SOC) is determined to be an important criteria to consider when determining whether to receive information, the onboard controller 18 can operate in step 130 to assign a respective communication priority to each of the at least one data subset reference based on a priority criteria representing a threshold vehicle power supply level. Therefore, in step 140, the onboard controller 18 automatically controls the onboard communication device 14 to communicate with at least one of the external data sources based on a detected vehicle power supply level in relation to the threshold vehicle power supply level. In other words, the relationship between the detected vehicle power supply level and the threshold vehicle power supply level would function as a trigger. While the onboard controller 18 determines in step 140 that detected vehicle power supply level is equal to or above the threshold vehicle power supply level, the onboard controller 18 can automatically control the onboard communication device 14 to communicate with at least one of the external data sources discussed above. Furthermore, the onboard controller 18 can automatically control the onboard communication device 14 to communicate with at least one of the external data sources based on a determination that the vehicle 10 is coupled to the external electrical power source and otherwise to refrain from attempting to communicate with any of the external data sources.

Alternatively, if the security condition of the external data sources is determined to be an important criterion to consider when determining whether to receive information, the onboard controller 18 can operate in step 130 to assign a respective communication priority to each of the data subset references based on the priority criteria representing a prescribed data source security condition. In other words, the data source security condition would function as a trigger. While the onboard controller 18 determines in step 140 that the detected data source security condition complies with the prescribed data source security condition, the onboard controller 18 can automatically control the onboard communication device 14 to communicate with at least one of the external data sources discussed above. For instance, when the data source security condition represents a secured data source, the onboard controller 18 automatically controls the onboard communication device 14 in step 140 to communicate with the external data source or sources for which the detected security condition indicates a secured data source. On the other hand, when the data source security condition represents an unsecured data source, the onboard controller 18 automatically controls the onboard communication device 14 in step 140 to communicate with the external data source or sources for which the detected security condition indicates an unsecured data source (or a secured data source, since security is not a concern).

In another example, if the predicted travel schedule of the vehicle 10 as discussed above is determined to be an important criteria to consider when determining whether to receive information, the onboard controller 18 can operate in step 130 to assign a respective communication priority to each of the data subset references based on the predicted travel schedule. In other words, the locations 42, 44, 46 and 48 of the vehicle 10 along the route 40 could function as a trigger. While the onboard controller 18 determines in step 140 that a detected location of the vehicle 10 indicates that the vehicle 10 is at one of the locations 42, 44, 46 or 48, the onboard controller 18 can automatically control the onboard communication device 14 to communicate with at least one of the external data sources discussed above. Thus, the onboard controller 18 can automatically control the onboard communication device 14 to communicate with at least one of the external data sources based on at least one detected position of the vehicle 10 in relation to the predicted travel schedule along route 40. Moreover, as discussed above with regard to Tables 2 and 5 through 8, the onboard controller 18 can detect the availability of the external data sources in step 120 and assign the respective communication criteria to the data subset references based on the availability of the external data sources in step 130 as discussed above. Hence, the onboard controller 18 can automatically control the onboard communication device 14 to communicate with at least one of the external data sources based on at least one detected position of the vehicle 10 along the predicted navigation route 40 in relation to at least one detected location of an available one of the external data sources.

In a further example, if the departure time of the vehicle 10 from the starting location 42 as discussed above is determined to be an important criteria to consider when determining whether to receive information, the onboard controller 18 can operate in step 130 to assign a respective communication priority to each of the data subset references based on the expected departure time of the vehicle 10 from a parked state at the starting location 42. In other words, the expected departure time of the vehicle 10 from the starting location 42 could function as a trigger. While the onboard controller 18 determines in step 140 that a current time is within a prescribed time before the expected departure time, the onboard controller 18 can automatically control the onboard communication device 14 to communicate with at least one of the external data sources discussed above.

In still another example, if a shutdown operation of the vehicle 10 from the starting location 42 as discussed above is determined to be an important criteria to consider when determining whether to receive information, the onboard controller 18 can operate in step 130 to assign a respective communication priority to each of the data subset references based on the shutdown operation of the vehicle 10 from a parked state at the starting location 42. In other words, the shutdown operation of the vehicle 10 that can occur when the vehicle 10 is at the destination location 44 could function as a trigger. While the onboard controller 18 determines in step 140 that a vehicle shutdown process has begun, the onboard controller 18 can automatically control the onboard communication device 14 to communicate with at least one of the external data sources discussed above.

In still a further example, if a synchronization process between the onboard controller 18 and at least one of the external data sources is determined to be an important criteria to consider when determining whether to receive information, the onboard controller 18 can operate in step 130 to assign a respective communication priority to each of the data subset references based on the occurrence of the synchronization process. In other words, the synchronization process that can occur could function as a trigger. While the onboard controller 18 determines in step 140 that a synchronization process has begun, the onboard controller 18 can automatically control the onboard communication device 14 to communicate with at least one of the external data sources discussed above.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle information gathering system comprising:
an onboard communication device configured to communicate with a plurality of external data sources;
an onboard storage device, wherein the onboard controller is further configured to repeatedly determine the availability of each of the plurality of external data sources and adjust the priority levels of the data subset references as the current vehicle location changes configured to store a data set comprising a plurality of data subset references, each of the data subset references having a respective one of a plurality of priority levels assigned thereto; and
an onboard controller configured to automatically determine an availability of each of the plurality of external data sources at a current vehicle location, automatically assign a respective communication priority for the current vehicle location to each of the respective data subset references based on the availability of each of the plurality of external data sources at the current vehicle location and the respective priority levels assigned thereto, automatically assign at least one of the plurality of external data sources at the current vehicle location to each of the data subset references based on the availability and the priority levels, and automatically control the communication device to communicate with at least one of the external data sources at the current vehicle location based on the respective communication priority assigned to each of the data subset references to receive at least one data subset via the assigned external data source for storage on the storage device.

2. The vehicle information gathering system according to claim 1, wherein
each of the plurality of priority levels is based on at least one of data type, size, preferred external data source, preferred connection protocol, importance, time criticality, vehicle power supply charging state, vehicle travel state and security level.

3. The vehicle information gathering system according to claim 1, wherein
the controller is configured to control the communication device to communicate with the at least one of the external data sources so that the at least one data subset is pushed to the storage device from the at least one of the plurality of external data sources.

4. The vehicle information gathering system according to claim 1, wherein
the communication device comprises a plurality of communication interfaces configured to communicate with the plurality of external data sources.

5. The vehicle information gathering system according to claim 4, wherein
the plurality of communication interfaces includes at least two of a telematics interface, a mobile interface, a mobile device tethering interface, a satellite interface, a wireless Internet interface, a wired Internet interface, an infrastructure communication interface and a vehicle-to-vehicle communication interface.

6. The vehicle information gathering system according to claim 1, wherein
the controller is further configured to assign a respective trigger event to each of the respective data subset references, and to automatically control the communication device to begin receiving the corresponding data subset only upon determining that the assigned trigger event has occurred.

7. The vehicle information gathering system according to claim 1, wherein
the controller assigns the respective communication priority to each of the respective data subset references based on at least one of the plurality of priority levels representing a prescribed vehicle travel state, and the controller automatically controls the communication device to communicate with at least a certain one of the external data sources instead of at least one other of the external data sources based on a detected vehicle travel state of the vehicle in relation to the prescribed vehicle travel state.

8. The vehicle information gathering system according to claim 7, wherein
the controller automatically controls the communication device to communicate with the at least a certain one of the external data sources instead of the at least one other of the external data sources while the detected vehicle travel state indicates that the vehicle is stationary.

9. The vehicle information gathering system according to claim 7, wherein
the controller automatically controls the communication device to communicate with the at least a certain one of the external data sources instead of the at least one other of the external data sources while the detected vehicle travel state indicates that the vehicle is moving.

10. The vehicle information gathering system according to claim 1, wherein
the controller assigns the respective communication priority to each of the respective data subset references based on at least one of the plurality of priority levels representing a threshold vehicle power supply level, and the controller automatically controls the communication device to communicate with at least one of the external data sources based on a detected vehicle power supply level in relation to the threshold vehicle power supply level.

11. The vehicle information gathering system according to claim 10, wherein
the controller automatically controls the communication device to communicate with at least one of the external data sources while the detected vehicle power supply level is above a prescribed level.

12. The vehicle information gathering system according to claim 1, wherein
the controller assigns the respective communication priority to each of the respective data subset references based on at least one of the plurality of priority levels representing a prescribed data source security condition, and the controller automatically controls the communication device to communicate with at least one of the external data sources based on a detected security condition of the at least one of the external data sources in relation to the prescribed data source security condition.

13. The vehicle information gathering system according to claim 12, wherein
when the data source security condition represents a secured data source, the controller automatically controls the communication device to communicate with the at least one of the external data sources for which the detected security condition indicates a secured data source.

14. The vehicle information gathering system according to claim 12, wherein
when the data source security condition represents an unsecured data source, the controller automatically controls the communication device to communicate with the at least one of the external data sources for which the detected security condition indicates any of an unsecured data source and a secured data source.

15. The vehicle information gathering system according to claim 1, wherein
the controller assigns the respective communication priority to each of the respective data subset references based on at least one of the plurality of priority levels representing a predicted travel schedule of the vehicle, and the controller automatically controls the communication device to communicate with at least one of the external data sources based on at least one detected position of the vehicle in relation to the predicted travel schedule.

16. The vehicle information gathering system according to claim 1, wherein
the controller assigns the respective communication priority to each of the respective data subset references based on at least one of the plurality of priority levels representing a predicted navigation route for the vehicle and a predicted availability of at least one of the external data sources along the predicted navigation route, and the controller automatically controls the communication device to communicate with at least one of the external data sources based on at least one detected position of the vehicle along the predicted navigation route in relation to at least one detected location of an available one of the external data sources.

17. The vehicle information gathering system according to claim 1, wherein
the controller assigns the respective communication priority to each of the respective data subset references based on at least one of the plurality of priority levels representing whether the vehicle is coupled to an external electrical power source, and the controller automatically controls the communication device to communicate with at least one of the external data sources based on a determination that the vehicle is coupled to the external electrical power source and otherwise to refrain from attempting to communicate with any of the external data sources.

18. The vehicle information gathering system according to claim 1, wherein
the controller assigns the respective communication priority to each of the respective data subset references based on at least one of the plurality of priority levels representing an expected departure time of the vehicle from a parked location, and the controller automatically controls the communication device to communicate with at least one of the external data sources based on a determination that a current time is within a prescribed time before the expected departure time.

19. The vehicle information gathering system according to claim 1, wherein
the controller assigns the respective communication priority to each of the respective data subset references based on at least one of the plurality of priority levels representing a shutdown operation of the vehicle, and the controller automatically controls the communication device to communicate with at least one of the external data sources based on a determination that the shutdown operation of the vehicle has begun.

20. The vehicle information gathering system according to claim 1, wherein
the controller assigns the respective communication priority to each of the respective data subset references based on at least one of the plurality of priority levels representing a synchronization process between the controller and at least one of the external data sources, and the controller automatically controls the communication device to communicate with at least one of the external data sources based on a determination that the synchronization process has begun.

21. The vehicle information gathering system according to claim 1, wherein
the controller is further configured to control the communication device to provide at least one received data subset to at least one other vehicle.

* * * * *